(12) United States Patent
Harris, III et al.

(10) Patent No.: US 11,640,168 B2
(45) Date of Patent: May 2, 2023

(54) SYSTEM AND METHOD FOR CONTROLLING A DRIVING SYSTEM

(71) Applicant: Faraday & Future Inc., Gardena, CA (US)

(72) Inventors: John Henry Harris, III, San Gabriel, CA (US); Kameron Fraige Saad Buckhout, Sr., Inglewood, CA (US)

(73) Assignee: Faraday & Future Inc., Gardena, CA (US)

( * ) Notice: Subject to any disclaimer, the term of this patent is extended or adjusted under 35 U.S.C. 154(b) by 0 days.

(21) Appl. No.: 15/691,606

(22) Filed: Aug. 30, 2017

(65) Prior Publication Data

US 2018/0188729 A1 Jul. 5, 2018

Related U.S. Application Data

(60) Provisional application No. 62/382,152, filed on Aug. 31, 2016.

(51) Int. Cl.
| | |
|---|---|
| *G05D 1/00* | (2006.01) |
| *B60W 40/04* | (2006.01) |
| *B60W 40/105* | (2012.01) |
| *F16H 61/02* | (2006.01) |
| *G05D 1/02* | (2020.01) |
| *B60W 10/10* | (2012.01) |
| *G01S 19/42* | (2010.01) |
| *B60W 50/00* | (2006.01) |
| *F16H 59/66* | (2006.01) |

(52) U.S. Cl.
CPC ........... *G05D 1/0088* (2013.01); *B60W 10/10* (2013.01); *B60W 40/04* (2013.01); *B60W 40/105* (2013.01); *F16H 61/0204* (2013.01); *F16H 61/0213* (2013.01); *G05D 1/0278* (2013.01); *B60W 2050/0002* (2013.01); *F16H 2059/666* (2013.01); *F16H 2061/0234* (2013.01); *G01S 19/42* (2013.01); *Y02T 10/84* (2013.01)

(58) Field of Classification Search
CPC ... G05D 1/0088; G05D 1/0278; B60W 10/10; B60W 40/04; B60W 40/105; B60W 2050/0002; B60W 30/18063; B60W 10/11; F16H 61/0204; F16H 61/0213; F16H 61/16; G01S 19/42; F03G 5/06; G01C 21/3415; G01C 21/3484; G06V 20/582; G08G 1/07
See application file for complete search history.

(56) References Cited

U.S. PATENT DOCUMENTS

| | | | | |
|---|---|---|---|---|
| 9,331,548 | B1 * | 5/2016 | Al Mattar | ................. F03G 5/06 |
| 2008/0125946 | A1 * | 5/2008 | Fakler | ................. F16H 61/0213 701/62 |
| 2010/0010732 | A1 * | 1/2010 | Hartman | ............ G01C 21/3484 701/532 |
| 2012/0310499 | A1 * | 12/2012 | Kiefer | ................. F16H 61/0213 701/65 |

(Continued)

*Primary Examiner* — Yuri Kan
(74) *Attorney, Agent, or Firm* — Veros Legal Solutions, LLP

(57) ABSTRACT

Systems and methods relating to controlling a driving system operatively coupled to a vehicle are disclosed. A location is identified using one or more sensors included with the vehicle. An input of the driving system is identified using the location. A desired output of the driving system is determined using the input.

20 Claims, 5 Drawing Sheets

(56) References Cited

U.S. PATENT DOCUMENTS

| | | | | |
|---|---|---|---|---|
| 2014/0336886 | A1* | 11/2014 | Rayala | B60W 10/11 |
| | | | | 701/53 |
| 2016/0245405 | A1* | 8/2016 | Petridis | F16H 61/16 |
| 2016/0362109 | A1* | 12/2016 | Schneider | B60W 30/18063 |
| 2017/0154529 | A1* | 6/2017 | Zhao | B60W 30/12 |
| 2017/0176996 | A1* | 6/2017 | Ferguson | G05D 1/0214 |
| 2017/0218862 | A1* | 8/2017 | Dufford | B60W 10/06 |

* cited by examiner

SYSTEM AND METHOD FOR CONTROLLING A DRIVING SYSTEM

CROSS-REFERENCE TO RELATED APPLICATIONS

This application claims the benefit of U.S. Provisional Application No. 62/382,152, filed Aug. 31, 2016, the entirety of which is hereby incorporated by reference.

FIELD OF THE DISCLOSURE

The present invention relates to controlling a driving system of a vehicle, and more specifically to controlling a driving system of a vehicle using a determination of a location of the vehicle.

BACKGROUND OF THE DISCLOSURE

Many modern vehicles include a vehicle control system, which is connected to or operatively coupled to various driving systems to perform tasks related to the operation of the vehicle. Many such driving systems generate output based on a combination of driver input—generated by, for example, an automobile driver pressing an accelerator pedal or positioning a gear shift lever—and vehicle operation data, for example, the current engine speed. Both driver input and vehicle operation data are imperfect sources of input. Driver input is potentially error-prone, intellectually or physically taxing on the driver, and limited by the driver's own understanding of his or her surroundings. And vehicle operation data may not reflect the driver's intentions or future actions in operating the vehicle. It is an objective of the present invention to improve the operation of driving systems by using additional sources of input, such as data representing the location of the vehicle—obtainable via sensors and systems, such as GPS, on many vehicles—to supplement (or even replace entirely) driver input generated by a human operator and vehicle operation data.

SUMMARY OF THE DISCLOSURE

An example of the present invention is directed to a vehicle using location data to determine a desired output of a driving system. Location data may include a vehicle's current position or orientation in a world coordinate system. In some examples, location data can be obtained using a sensor such as a GPS receiver. In some examples, location data may be obtained from cellular data signals or Wi-Fi signals. In one aspect of the invention, location data is used to identify an input of a driving system. In some examples, location data can be used to identify local map data, which may include data that relates geographic features to coordinates in a world coordinate system, which local map data can then be used to identify an input of a driving system. In some examples, location data can be used to identify local real-time data such as current traffic conditions or weather conditions, which local real-time data can then be used to identify an input of a driving system. In some examples, location data can be used to identify route data, such as the vehicle's position on a desired travel route between two points, which route data can then be used to identify an input of a driving system. In some examples, location data can be used to identify local crowd data, which may include data (such as speeds and driving system settings at that location) supplied by other vehicles or drivers, which local crowd data can then be used to identify an input of a driving system.

In another aspect of the invention, an input of a driving system is used to determine an output of the driving system. In some examples, the driving system is an automatic (or otherwise computer-controlled) transmission and the input value is a desired gear ratio. In some examples, the driving system is an assistive driving system that can be enabled or disabled, such as an anti-lock braking system or a traction control system, and the input value is a desired on/off setting. Other examples will be made apparent.

DETAILED DESCRIPTION

Examples of the present invention are directed to using location data relating to a vehicle, such as may be obtained by a sensor or a positioning system, such as an on-board or otherwise operatively coupled Global Positioning System ("GPS"), to identify an input of a driving system. In some examples, the location data is used to identify map data, real-time data, route data, and/or crowd data related to the vehicle's location, which data is then used to identify such an input.

A vehicle according to the present invention may be an autonomous vehicle. As used herein, an autonomous vehicle can be a vehicle which performs one or more autonomous driving operations. Autonomous driving can refer to fully autonomous driving, partially autonomous driving, and/or driver assistance systems.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
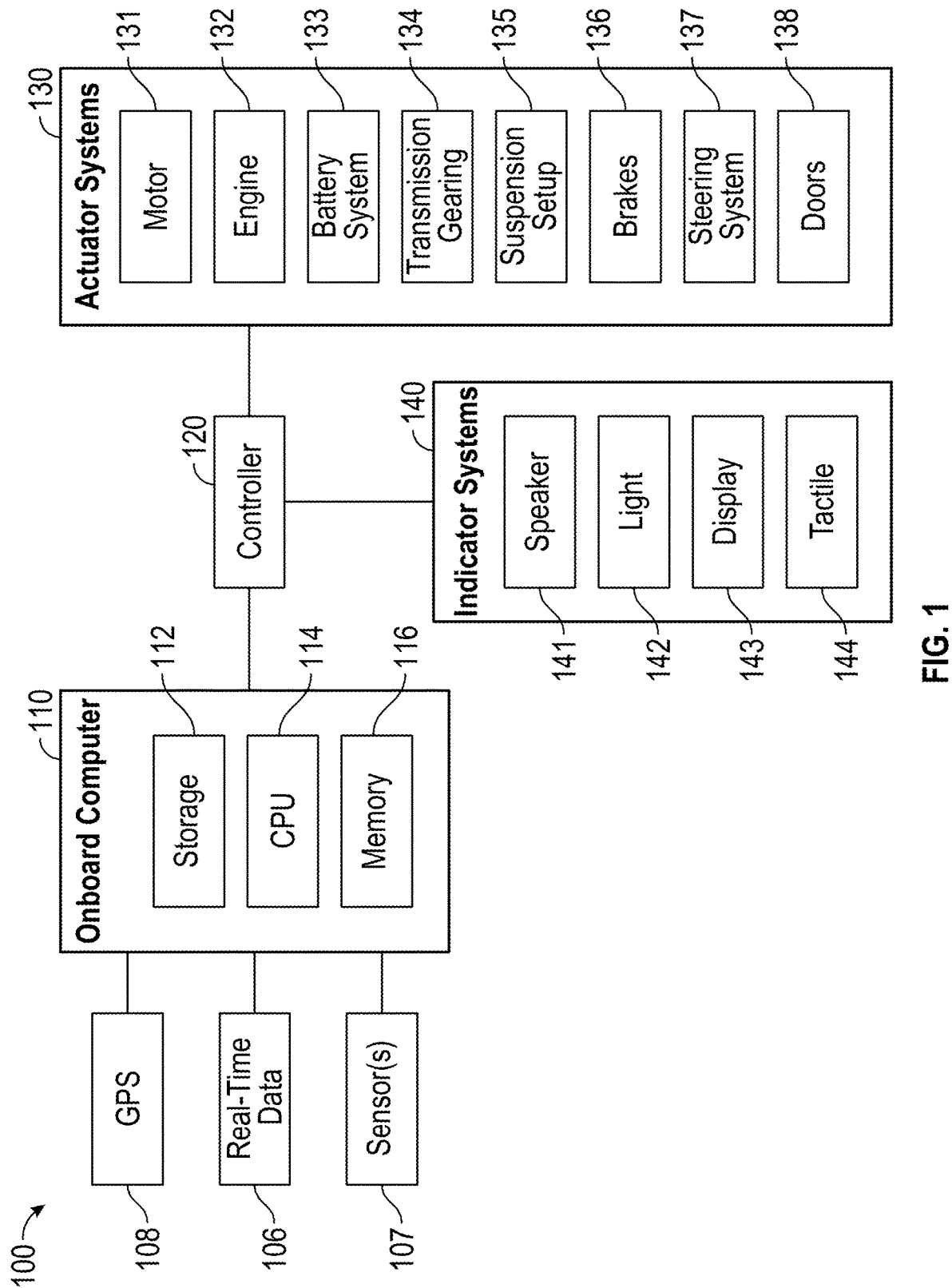
FIG. 1 illustrates a system block diagram of a vehicle control system according to examples of the disclosure.

FIG. 1 illustrates an exemplary system block diagram of vehicle control system 100 according to examples of the disclosure. System 100 can be incorporated into a vehicle, such as a consumer automobile. Other example vehicles that may incorporate the system 100 include, without limitation, airplanes, boats, or industrial automobiles. Vehicle control system 100 can include one or more receivers 106 for real-time data, such as current traffic patterns or current weather conditions. Vehicle control system 100 can also include one or more sensors 107 (e.g., microphone, optical camera, radar, ultrasonic, LIDAR, etc.) that either individually or collectively are capable of detecting various characteristics of the vehicle's surroundings, such as the position and orientation of objects relative to the vehicle or a sensor; and a satellite (e.g., GPS system 108) capable of determining an approximate position of the vehicle relative to a world coordinate system.

Data from one or more sensors (e.g., LIDAR data, radar data, ultrasonic data, camera data, etc.) can be fused together. This fusion can occur at one or more electronic control units (ECUs). The particular ECU(s) that are chosen to perform data fusion can be based on an amount of resources (e.g., processing power and/or memory) available to the one or more ECUs, and can be dynamically shifted between ECUs and/or components within an ECU (since an ECU can contain more than one processor) to optimize performance.

Vehicle control system 100 can include an onboard computer 110 that is coupled to the receivers 106, sensors 107 and satellite (e.g., GPS) receiver 108, and that is capable of receiving data from the receivers 106, sensors 107 and satellite (e.g., GPS) receiver 108. The onboard computer 110 can include storage 112, memory 116, and a processor 114. Processor 114 can perform any of the methods described herein.

Additionally, storage 112 and/or memory 116 can store data and instructions for performing any of the methods described herein. Storage 112 and/or memory 116 can be any non-transitory computer readable storage medium, such as a solid-state drive or a hard disk drive, among other possibilities. The vehicle control system 100 can also include a controller 120 capable of controlling one or more aspects of vehicle operation, such as indicator systems 140 and actuator systems 130.

In some examples, the vehicle control system 100 can be connected or operatively coupled to (e.g., via controller 120) one or more driving systems, such as actuator systems 130 in the vehicle and indicator systems 140 in the vehicle. The one or more actuator systems 130 can include, but are not limited to, a motor 131 or engine 132, battery system 133, transmission gearing 134, suspension setup 135, brakes 136, steering system 137 and door system 138. The vehicle control system 100 can control, via controller 120, one or more of these actuator systems 130 during vehicle operation; for example, to open or close one or more of the doors of the vehicle using the door actuator system 138, or to control the vehicle during autonomous or semi-autonomous driving or parking operations, using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle).

In one example, input data from sensors 107 and/or GPS receiver 108 can be used to identify a location of a vehicle relative to a world coordinate system, which location is then used to improve the operation of a driving system of the vehicle. Examples of the disclosure are directed to using a location system, such as a GPS location system, to identify a location of the vehicle, and further to using that location to identify an input of a driving system, allowing that driving system to take the vehicle's location into account during its operation. The disclosure is not limited to the use of GPS to identify a location. Some examples may use other systems or techniques for identifying a vehicle's location, for example, triangulation using cellular data signals or Wi-Fi signals. As used herein, a sensor includes receivers such as GPS receivers.

As used herein, a driving system is any of the systems included in a vehicle, which comprise one or more inputs, and one or more outputs related to a driving operation of the vehicle. Driving systems include the example actuator systems 130 shown in FIG. 1; the example indicator systems 140 shown in FIG. 1; systems directly related to driving operations, such as engine systems, transmission systems, drivetrain systems, suspension systems, and fuel systems; and systems indirectly related to driving operations, such as in-vehicle entertainment systems, security systems, climate control systems, and lighting systems. The disclosure is not limited to any particular type or category of driving system.

As used herein, an input to a system is any value or parameter used by the system that may be set, determined, or identified by a source external to the system. Inputs may, but need not, be variable. For example, in an automatic transmission system for a vehicle, inputs may include fixed gear ratio values (corresponding to first gear, second gear, reverse, etc.) which are determined by the mechanical characteristics of the vehicle gearing; fixed "shift points," corresponding to engine conditions for gear ratio transitions, which are set by the vehicle manufacturer; and the variable position of an automatic shift lever, corresponding to a mode of operation of the automatic transmission, which is set by the driver. The disclosure is not limited to any particular type or category of input, nor does the disclosure require any particular relationship between inputs.

It should be appreciated that in some embodiments a learning algorithm can be implemented such as an as a neural network (deep or shallow) and be applied instead of, or in conjunction with another algorithm described herein to solve a problem, reduce error, and increase computational efficiency. Such learning algorithms may implement a feed-forward neural network (e.g., a convolutional neural network) and/or a recurrent neural network, with structured learning, unstructured learning, and/or reinforcement learning. In some embodiments, backpropagation may be implemented (e.g., by implementing a supervised long short-term memory recurrent neural network, or a max-pooling convolutional neural network which may run on a graphics processing unit). Moreover, in some embodiments, unstructured learning methods may be used to improve structured learning methods. Moreover still, in some embodiments, resources such as energy and time may be saved by including spiking neurons in a neural network (e.g., neurons in a neural network that do not fire at each propagation cycle).

Figure 2:
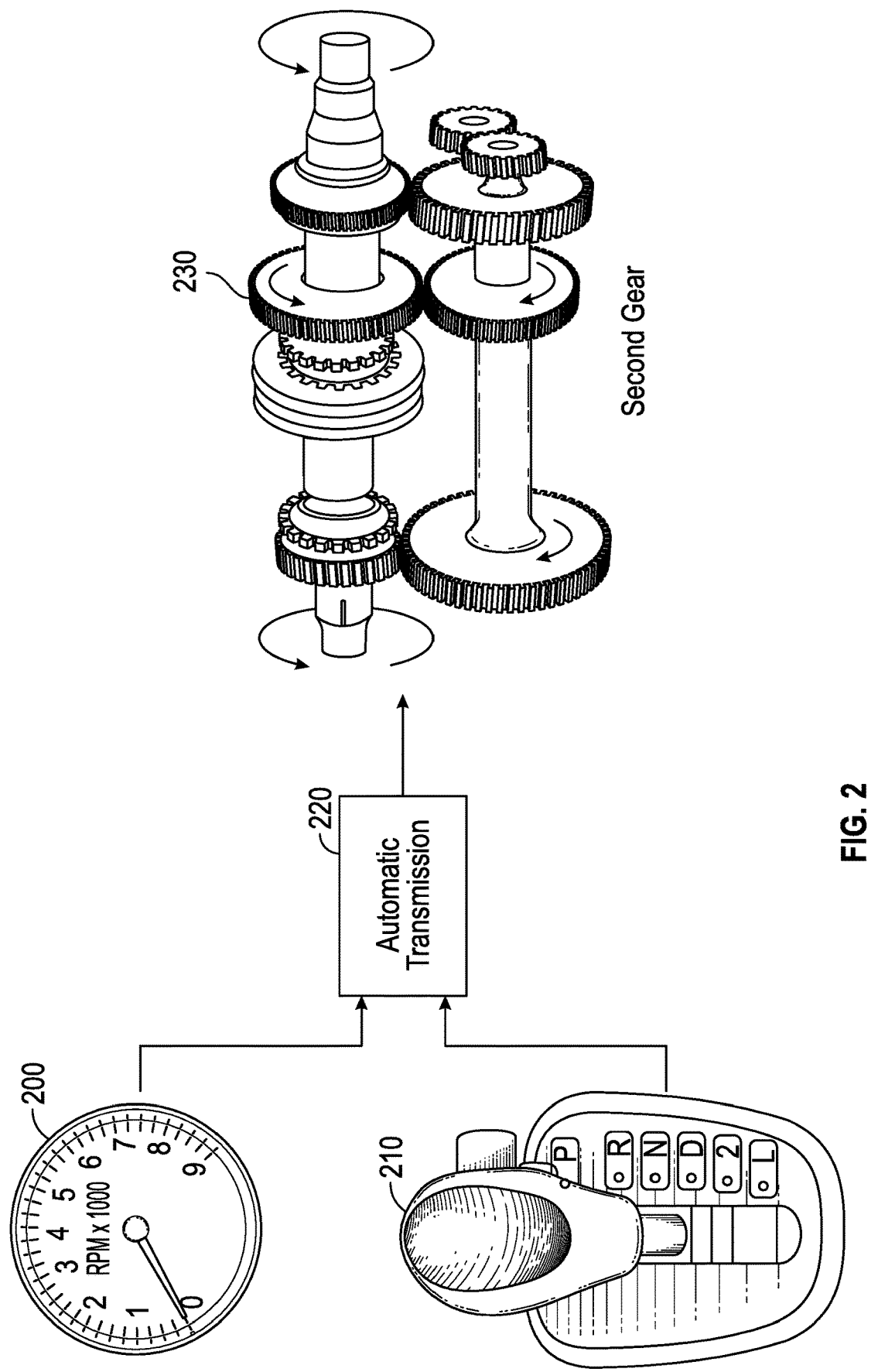
FIG. 2 illustrates an example scenario in which a driving system uses driver input and vehicle operation input to determine an output of the driving system.

FIG. 2 illustrates an example of a driving system included in a vehicle. The example driving system pictured is an automatic transmission 220 that accepts as input engine speed 200 and shift lever position 210, and outputs setting gearing 230 to a desired gear ratio based on inputs 200 and 210.

Figure 3:
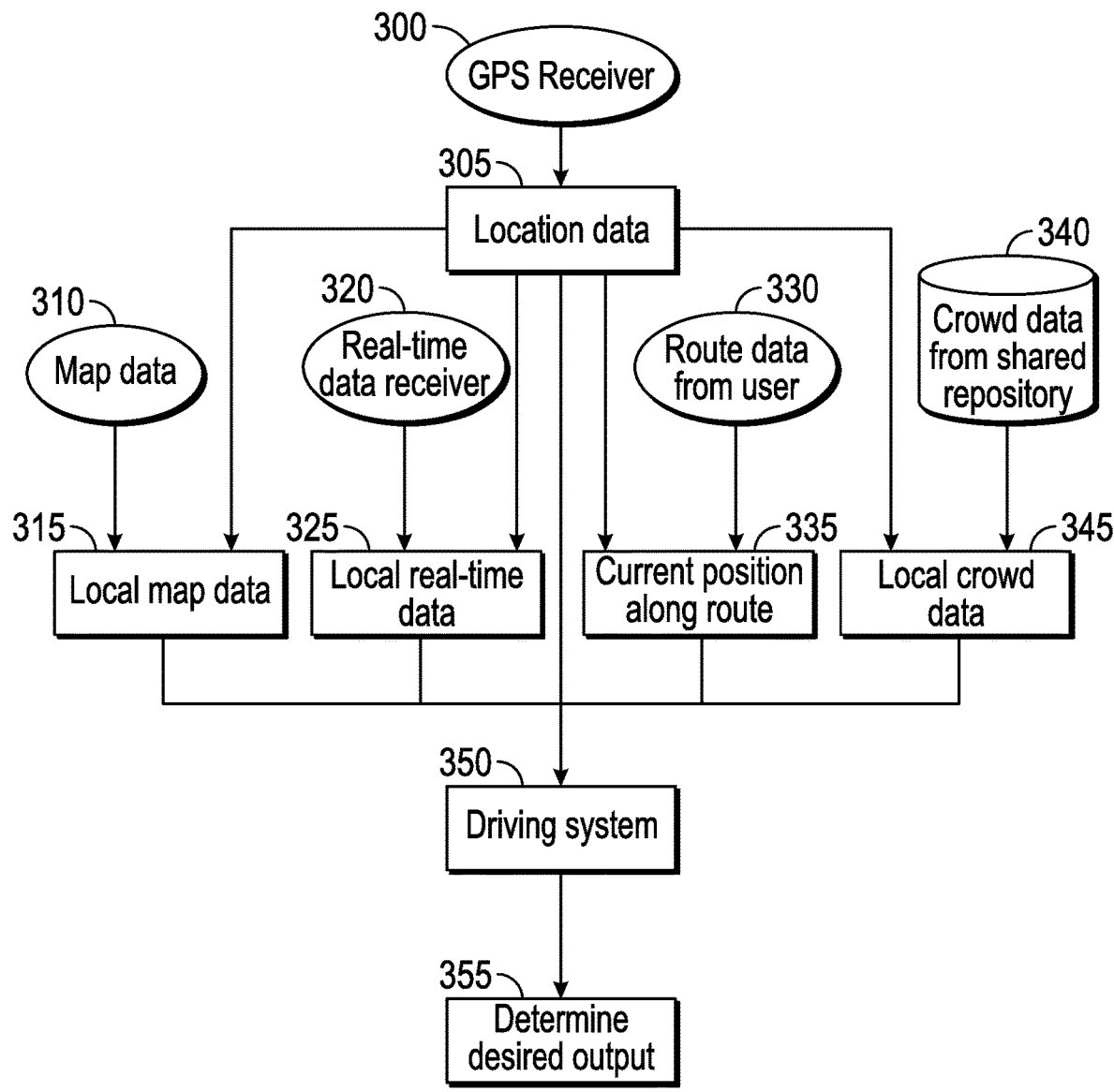
FIG. 3 illustrates a block diagram of a process executed by a processor in an example of the invention.

FIG. 3 illustrates a block diagram showing an example process executed by a processor included in a vehicle in an example of the invention. It will be appreciated by those skilled in the art that the example process shown in FIG. 3 could be implemented as multiple processes, executed by one or more processors, using known techniques and without departing from the present invention. In the example process shown, the processor obtains the vehicle's location data 305 from GPS receiver 300, which is configured to identify the location of the vehicle using the GPS system and to output data relating to that location.

In the example process shown in FIG. 3, map data 310 is a set of data that relates geographic features of a mapped region to geographic coordinates, such as coordinates obtained from a GPS system or a survey. Map data may include, for example, topographical data, such as data relating to terrain and natural surfaces; structural data, such as data relating to roads, buildings, signage, and man-made structures; political data, such as data relating to cities, towns, and other political divisions, or to legal information such as local driving laws and speed limits; or socioeconomic data, such as data relating to places of business. In some examples, map data is commercially available map data, such as sold by vendors such as TomTom, HERE, and Sanborn. In some examples, map data is provided by the vehicle, the vehicle's manufacturer, and/or third parties.

In the example process shown in FIG. 3, the processor uses location data 305 to identify, from map data 310, local map data 315 that is relevant to the vehicle's current location. For example, local map data 315 could include map data identifying local roads (including a road on which the vehicle is currently driving, and including the type of road and the quality of the road surface), nearby businesses (such as restaurants or gas stations), and local speed limits. Local map data 315 can be identified from map data 310 by using location data 305 to identify a subset of map data 310 that relates to features in a mapped region near the current location.

In the example process shown in FIG. 3, real-time data receiver 320 is a receiver, such as receiver 106 shown in FIG. 1, configured to receive data, such as traffic conditions, weather conditions, or road conditions, that may vary continuously. In some examples, real-time data is received from a broadcast service, such as the World Area Forecast System provided by the United States National Weather Service. In some examples, receiver 106 is configured to receive real-time data via the internet, and the real-time data is provided by an internet service.

In the example process shown in FIG. 3, the processor uses location data 305 to identify, from real-time data receiver 320, local real-time data 325 that is relevant to the vehicle's current location. Local real-time data 325 could indicate, for example, that inclement weather is expected at the vehicle's current location, that traffic at the vehicle's location is unusually heavy, or that a road on which the vehicle is currently traveling is under construction.

In the example process shown in FIG. 3, route data 330 is provided by a driver and indicates a route the driver intends to travel. For example, route data 330 could include geographic coordinates of a starting point and a target destination. In the example process shown in FIG. 3, the processor uses location data 305 in combination with route data 330 to determine a current position 335 along the route indicated by the route data. For example, the processor could use location data 305 to determine that the vehicle is currently two miles from a driver's target destination, or that at current speeds, the vehicle is expected to reach the driver's target destination in five minutes.

In the example process shown in FIG. 3, crowd data 340 is data relating to a specific geographical location that is provided by other vehicles, drivers, or users and made available from a shared repository, such as a remote server configured to transmit and receive data via the internet. Crowd data 340 can include data of interest to other vehicles or drivers. For example, crowd data 340 could indicate that a significant number of drivers shifted into low gear when approaching a certain geographical location, experienced a drop in fuel efficiency at a certain geographical location, or engaged assistive driving systems at a certain geographical location. In some examples, a vehicle is configured to provide crowd data to a shared repository, with or without the driver's interaction, using techniques known in the art, where it can be later accessed by other vehicles or users. In some examples, crowd data is provided via a telemetry device, such as a mobile phone with a location system such as GPS. In some examples, crowd data is provided manually by a user. In some examples, a shared repository is not utilized, and crowd data is provided from a source to a receiver vehicle via a means such as a peer-to-peer network or a direct connection. It will be appreciated by those skilled in the art that many systems and methods for providing data, such as crowd data, are known in the art and can be used within the scope of the present invention.

In the example process shown in FIG. 3, the processor uses location data 305 to identify local crowd data 345 from crowd data 340. For example, local crowd data 345 can be identified from crowd data 340 by using location data 305 to identify a subset of crowd data 340 that relates to geographic coordinates near the current location.

In the example process shown in FIG. 3, the processor is configured to identify an input of driving system 350 and determine an output of driving system 350. In the example process shown in FIG. 3, the processor uses one or more of location data 305, local map data 315, local real-time data 325, current route position 335, and local crowd data 345 to identify an input of driving system 350. At stage 355 of the example process, the processor uses the input to determine a desired value of an output of driving system 350.

Figure 4A:
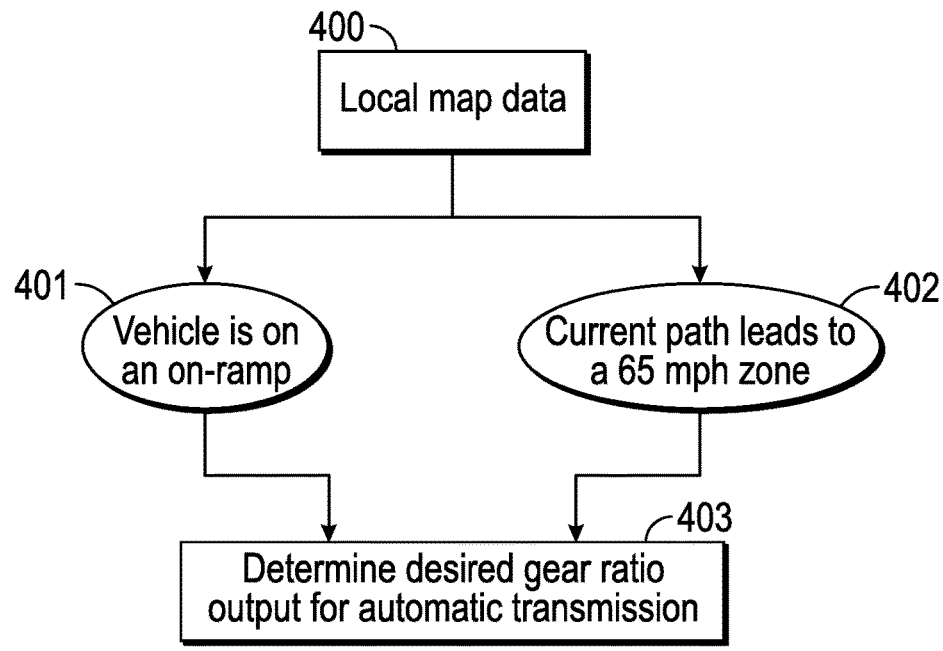
FIGS. 4A through 4D illustrate block diagrams of processes executed by a processor in examples of the invention.

FIG. 4A illustrates an example of how, in the example process shown in FIG. 3, the processor uses local map data to identify an input of a driving system included in a vehicle. At stage 401 of the example shown in FIG. 4A, it is identified that local map data 400 indicates, for example using data relating to nearby roads, that the vehicle is on an on-ramp leading to a highway. At stage 402 of the example, it is identified that local map data indicates, for example using data relating to local speed limits, that the on-ramp leads to a road on which the speed limit is 65 miles per hour. In the example, the information identified at stages 401 and 402 is used at stage 403 as input of an automatic transmission, a driving system, to determine a desired gear ratio output. In the example automatic transmission shown in FIG. 2, the automatic transmission 220 determines a desired gear ratio output based solely on the engine speed 200 and the shift lever position 210. In contrast, at stage 403 in the example shown in FIG. 4A, the automatic transmission is able to consider, as input, the additional information that the vehicle is likely to be in the process of accelerating to 65 miles per hour. This may result in a determination of a desired gear ratio output that is different from the desired gear ratio output that would be determined without this additional information. For example, knowing from the input that the vehicle is about to accelerate to 65 miles per hour, the automatic transmission can select a gear ratio output that will optimize that particular acceleration, instead of a gear ratio output dictated entirely by an engine speed and a shift lever position.

Figure 4B:
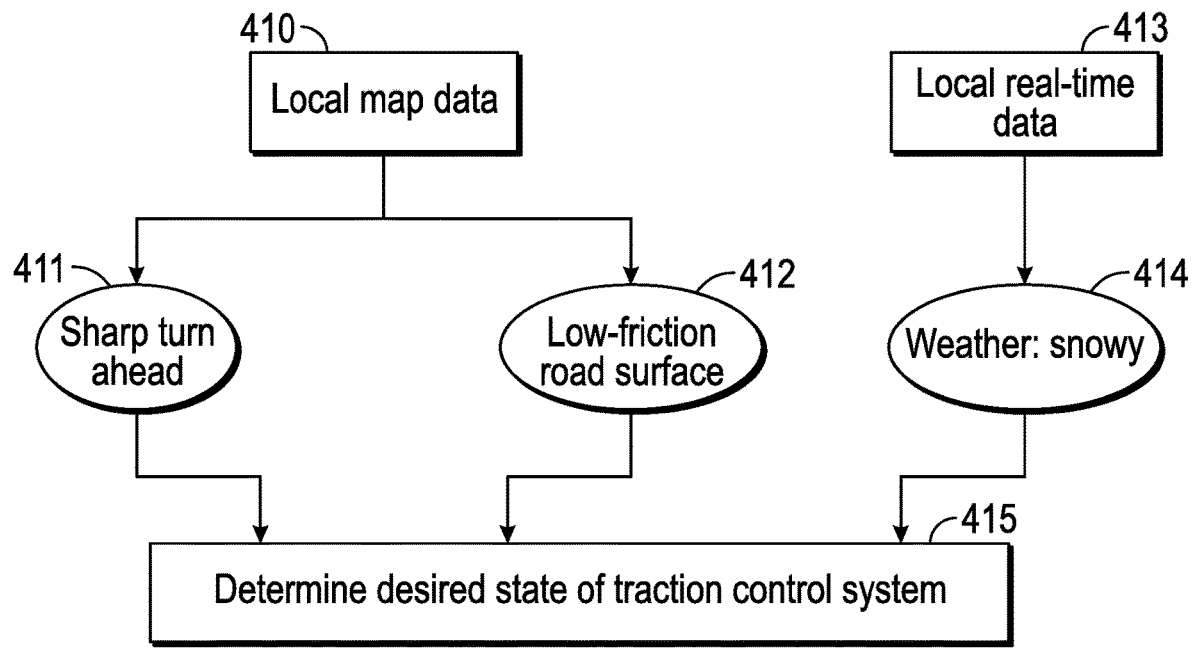

FIG. 4B illustrates an example of how, in the example process shown in FIG. 3, the processor uses local map data and local real-time data to identify an input of a driving system included in a vehicle. At stage 411 of the example shown in FIG. 4B, it is identified that local map data 410 indicates, for example using data relating to nearby roads, that the vehicle is on a road with sharp turns ahead. At stage 412 of the example, it is identified that local map data indicates, for example using data relating to road surfaces, that the vehicle is on a road comprised of a low-friction surface, such as dirt. At stage 414 of the example shown in FIG. 4B, it is identified that local real-time data 413 indicates, for example using data from a weather broadcast service, that current weather conditions are snowy. In the example, this information identified at stages 411, 412, and 414 is used at stage 415 as input of a traction control system, which is a driving system that can be enabled to prevent loss of traction, to determine whether the traction control system should be enabled or disabled. In this example, the information identified at stages 411, 412, and 414 indicates that the vehicle is likely operating in conditions where loss of traction is likely, and may be used at stage 415 to determine that the traction control system should be enabled to prevent such loss of traction.

Figure 4C:
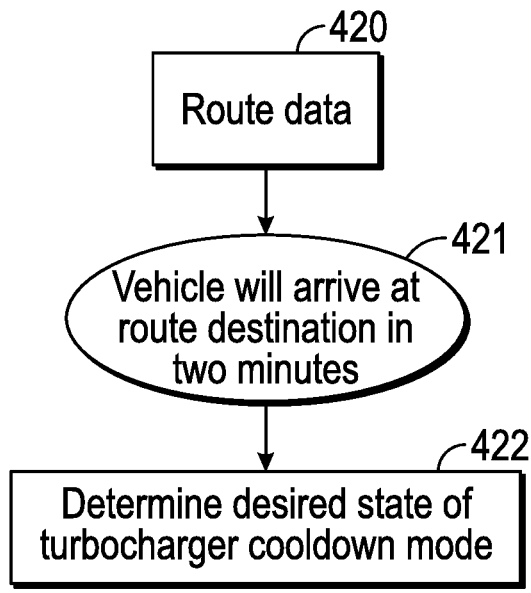

FIG. 4C illustrates an example of how, in the example process shown in FIG. 3, the processor uses route data to identify an input of a driving system included in a vehicle. At stage 421 of the example shown in FIG. 4C, it is identified that route data 420 indicates that the vehicle is expected to arrive at the driver's destination in two minutes. In this example, the information identified at stage 421 is used at stage 422 as input of a turbocharger cooldown mode, which is a driving system that can be enabled to allow an engine to return to normal temperatures after operating in a turbocharged state at elevated temperatures, to determine whether the cooldown mode should be enabled or disabled. The cooldown mode may be optimally enabled several minutes before the vehicle is turned off, to allow the engine to reach normal temperatures by the time the vehicle is turned off. In this example, the information identified at stage 421 indicates that the vehicle will likely be turned off shortly, because the vehicle is within two minutes of reaching the driver's destination, and may be used at stage 422 to determine that the cooldown mode should be enabled.

Figure 4D:
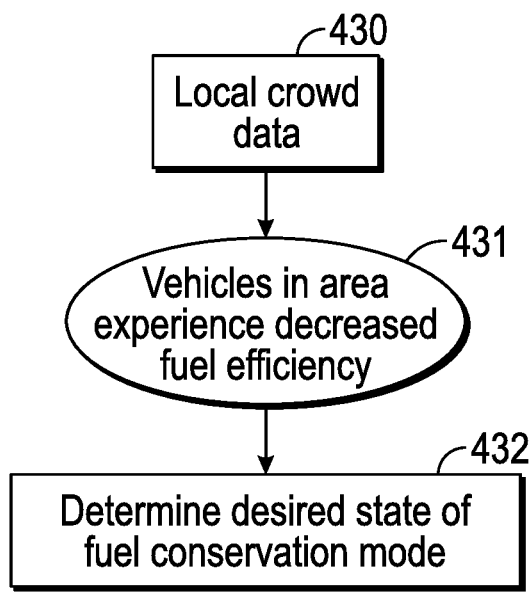

FIG. 4D illustrates an example of how, in the example process shown in FIG. 3, the processor uses crowd data to identify an input of a driving system included in a vehicle. At stage 431 of the example shown in FIG. 4D, it is identified that crowd data 430 indicates that other vehicles in the vehicle's area typically experience a decrease in fuel efficiency compared to operation in other areas. This crowd data could, for example, have been uploaded from other vehicles to a shared repository, and then downloaded from the repository by the vehicle, using techniques known in the art. In this example, the information identified at stage 431 is used at stage 432 as input of a fuel conservation mode, which is a driving system that can be enabled to optimize fuel consumption, to determine whether the fuel conservation mode should be enabled or disabled. It may be desirable for drivers to enable a fuel conservation mode in regions where fuel efficiency is unusually low. In this example, the information identified at stage 431 indicates that the vehicle may be in a region where fuel efficiency is unusually low, because other vehicles experience a drop in fuel efficiency, and may be used at stage 432 to determine that the fuel conservation mode should be enabled.

Some examples of the disclosure are directed to a method of controlling a driving system operatively coupled to a vehicle, the method comprising: identifying a location using one or more sensors included with the vehicle; identifying, using the location, an input of the driving system; and determining, using the input, a desired output of the driving system. Additionally or alternatively to one or more of the examples disclosed above, in some examples, the method further comprises identifying, using the location, local map data relating to the location, and the input of the driving system is identified using the local map data. Additionally or alternatively to one or more of the examples disclosed above, in some examples, the method further comprises identifying, using the location, local real-time data relating to the location, and the input of the driving system is identified using the local real-time data. Additionally or alternatively to one or more of the examples disclosed above, in some examples, the method further comprises identifying, using the location, route data relating to the location, and the input of the driving system is identified using the route data. Additionally or alternatively to one or more of the examples disclosed above, in some examples, the method further comprises identifying, using the location, data provided by one or more other vehicles or users relating to the location, and the input of the driving system is identified using the data provided by one or more other vehicles or users. Additionally or alternatively to one or more of the examples disclosed above, in some examples, the data provided by one or more other vehicles or users is obtained from a shared repository. Additionally or alternatively to one or more of the examples disclosed above, in some examples, the method further comprises identifying, using the location, data relating to the location, the data provided by a telemetry device, and the input of the driving system is identified using the data provided by the telemetry device. Additionally or alternatively to one or more of the examples disclosed above, in some examples, the method further comprises communicating a value of the input to a shared repository. Additionally or alternatively to one or more of the examples disclosed above, in some examples, the method further comprises communicating a value of the input to another vehicle. Additionally or alternatively to one or more of the examples disclosed above, in some examples, the vehicle is an autonomous vehicle.

Some examples of this disclosure are directed to a system comprising: one or more sensors included with a vehicle, the one or more sensors configured to present sensor data; one or more processors coupled to the one or more sensors; and a memory including instructions, which when executed by the one or more processors, cause the one or more processors to perform a method comprising: identifying a location using the one or more sensors; identifying, using the location, an input of a driving system operatively coupled to the vehicle; and determining, using the input, a desired output of the driving system. Additionally or alternatively to one or more of the examples disclosed above, in some examples, the method further comprises identifying, using the location, local map data relating to the location, and the input of the driving system is identified using the local map data. Additionally or alternatively to one or more of the examples disclosed above, in some examples, the method further comprises identifying, using the location, local real-time data relating to the location, and the input of the driving system is identified using the local real-time data. Additionally or alternatively to one or more of the examples disclosed above, in some examples, the method further comprises identifying, using the location, route data relating to the location, and the input of the driving system is identified using the route data. Additionally or alternatively to one or more of the examples disclosed above, in some examples, the method further comprises identifying, using the location, data provided by one or more other vehicles or users relating to the location, and the input of the driving system is identified using the data provided by one or more other vehicles or users.

Some examples of this disclosure are directed to a non-transitory machine-readable storage medium containing program instructions executable by a computer, the program instructions enabling the computer to perform: identifying a location using one or more sensors included with a vehicle; identifying, using the location, an input of a driving system operatively coupled to the vehicle; and determining, using the input, a desired output of the driving system. Additionally or alternatively to one or more of the examples disclosed above, in some examples, the program instructions further enable the computer to perform identifying, using the location, local map data relating to the location, and the input of the driving system is identified using the local map data. Additionally or alternatively to one or more of the examples disclosed above, in some examples, the program instructions further enable the computer to perform identifying, using the location, local real-time data relating to the location, and the input of the driving system is identified using the local real-time data. Additionally or alternatively to one or more of the examples disclosed above, in some examples, the program instructions further enable the computer to perform identifying, using the location, route data relating to the location, and the input of the driving system is identified using the route data. Additionally or alternatively to one or more of the examples disclosed above, in some examples, the program instructions further enable the computer to perform identifying, using the location, data provided by one or more other vehicles or users relating to the location, and the input of the driving system is identified using the data provided by one or more other vehicles or users.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of controlling a driving system of a vehicle, the method comprising:
   identifying a location using one or more sensors included with the vehicle;
   identifying, by an on-board computer of the vehicle, using the location, an input of the driving system, the input comprising crowd data indicating other vehicles in the vehicle's area experiencing a decrease in fuel efficiency compared to when operating in other areas; and
   determining and enabling, by an on-board computer of the vehicle, using the input, a desired output of the driving system;
   wherein the driving system comprises a vehicle transmission and wherein the desired output of the driving system comprising a fuel conservation mode that optimizes fuel consumption of the vehicle.

2. The method of claim 1, further comprising identifying, using the location, local map data relating to the location, and wherein the input of the driving system is identified using the local map data.

3. The method of claim 1, further comprising identifying, using the location, local real-time data relating to the location, and wherein the input of the driving system is identified using the local real-time data.

4. The method of claim 1, further comprising identifying, using the location, route data relating to the location, and wherein the input of the driving system is identified using the route data.

5. The method of claim 1, further comprising identifying, using the location, data provided by one or more other vehicles or users relating to the location, and wherein the input of the driving system is identified using the data provided by one or more other vehicles or users.

6. The method of claim 5, wherein the data provided by one or more other vehicles or users is obtained from a shared repository.

7. The method of claim 1, further comprising identifying, using the location, data relating to the location, the data provided by a telemetry device, and wherein the input of the driving system is identified using the data provided by the telemetry device.

8. The method of claim 1, further comprising communicating a value of the input to a shared repository.

9. The method of claim 1, further comprising communicating a value of the input to another vehicle.

10. The method of claim 1, wherein the vehicle is an autonomous vehicle.

11. A system comprising:
    one or more sensors included with a vehicle, the one or more sensors configured to present sensor data;
    one or more processors coupled to the one or more sensors; and
    a memory including instructions, which when executed by the one or more processors, cause the one or more processors to perform a method comprising:
      identifying a location using the one or more sensors;
      identifying, using the location, an input of a driving system operatively coupled to the vehicle, the input comprising crowd data indicating other vehicles in the vehicle's area experiencing a decrease in fuel efficiency compared to when operating in other areas; and
      determining and enabling, using the input, a desired output of the driving system;
      wherein the driving system comprises a vehicle transmission and wherein the desired output of the driving system comprising a fuel conservation mode that optimizes fuel consumption of the vehicle.

12. The system of claim 11, wherein the method further comprises identifying, using the location, local map data relating to the location, and wherein the input of the driving system is identified using the local map data.

13. The system of claim 11, wherein the method further comprises identifying, using the location, local real-time data relating to the location, and wherein the input of the driving system is identified using the local real-time data.

14. The system of claim 11, wherein the method further comprises identifying, using the location, route data relating to the location, and wherein the input of the driving system is identified using the route data.

15. The system of claim 11, wherein the method further comprises identifying, using the location, data provided by one or more other vehicles or users relating to the location, and wherein the input of the driving system is identified using the data provided by one or more other vehicles or users.

16. A non-transitory machine-readable storage medium containing program instructions executable by a computer, the program instructions enabling the computer to perform:
    identifying a location using one or more sensors included with a vehicle;
    identifying, using the location, an input of a driving system operatively coupled to the vehicle, the input comprising crowd data indicating other vehicles in the vehicle's area experiencing a decrease in fuel efficiency compared to when operating in other areas; and
    determining and enabling, using the input, a desired output of the driving system;
    wherein the driving system comprises a vehicle transmission and wherein the desired output of the driving system comprising a fuel conservation mode that optimizes fuel consumption of the vehicle.

17. The non-transitory machine-readable storage medium of claim 16, wherein the program instructions further enable the computer to perform identifying, using the location, local map data relating to the location, and wherein the input of the driving system is identified using the local map data.

18. The non-transitory machine-readable storage medium of claim 16, wherein the program instructions further enable the computer to perform identifying, using the location, local real-time data relating to the location, and wherein the input of the driving system is identified using the local real-time data.

19. The non-transitory machine-readable storage medium of claim 16, wherein the program instructions further enable the computer to perform identifying, using the location, route data relating to the location, and wherein the input of the driving system is identified using the route data.

20. The non-transitory machine-readable storage medium of claim 16, wherein the program instructions further enable the computer to perform identifying, using the location, data provided by one or more other vehicles or users relating to the location, and wherein the input of the driving system is identified using the data provided by one or more other vehicles or users.

* * * * *